Figure 4:
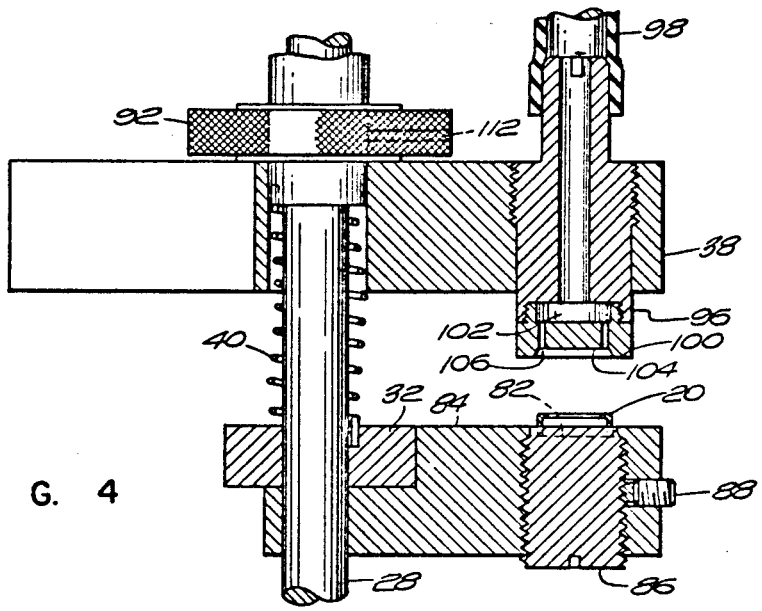

June 2, 1964    M. KNOBEL    3,135,041
APPARATUS FOR ASSEMBLING BALL BEARINGS
Filed June 27, 1963    2 Sheets-Sheet 1
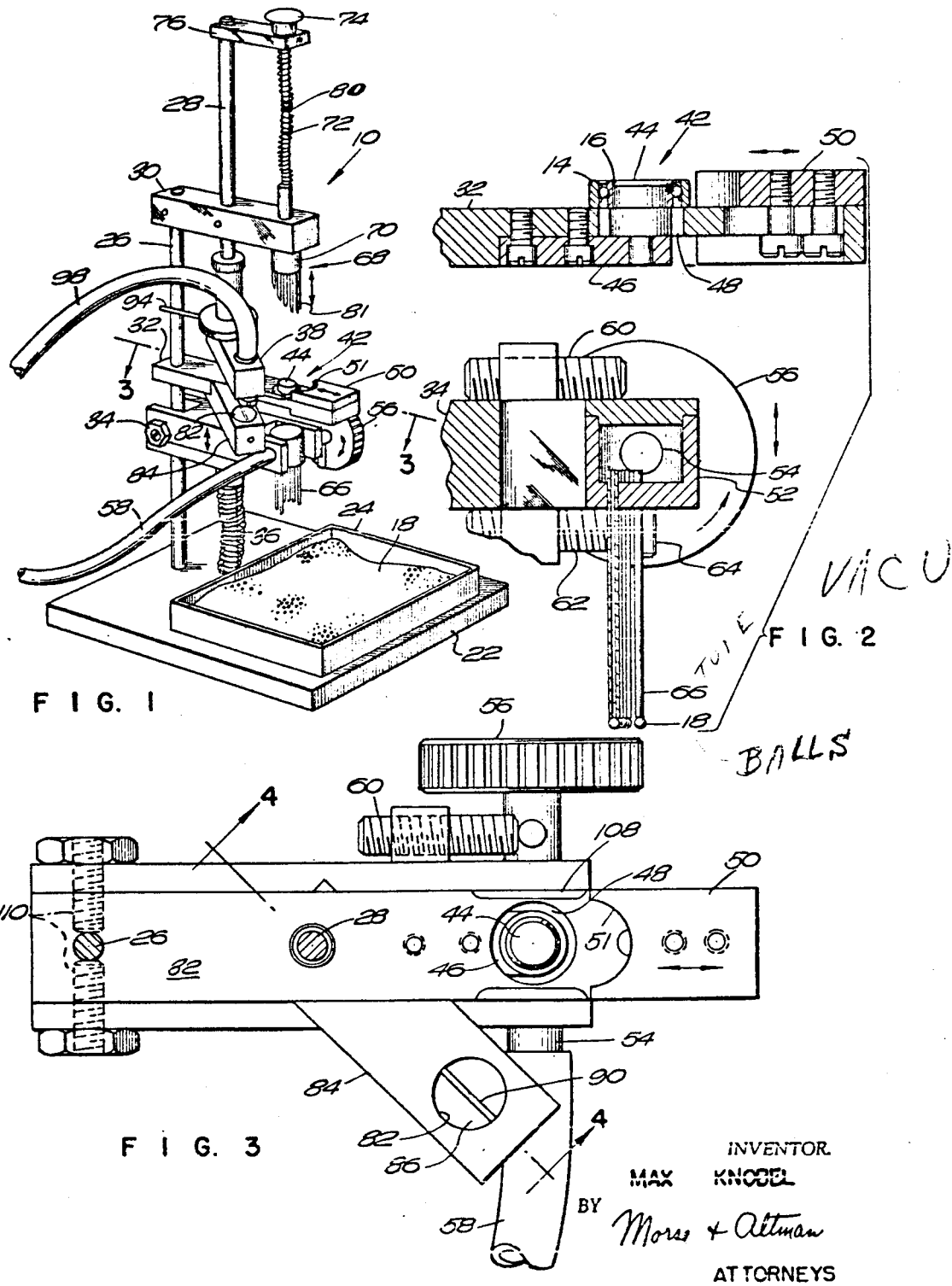
INVENTOR.
MAX KNOBEL
BY Morse & Altman
ATTORNEYS June 2, 1964 M. KNOBEL 3,135,041
APPARATUS FOR ASSEMBLING BALL BEARINGS
Filed June 27, 1963 2 Sheets-Sheet 2

INVENTOR.
MAX KNOBEL
BY Morse + Altman
ATTORNEYS

United States Patent Office 3,135,041
Patented June 2, 1964

1

3,135,041
APPARATUS FOR ASSEMBLING BALL BEARINGS
Max Knobel, 663 Beacon St., Boston, Mass.
Filed June 27, 1963, Ser. No. 290,965
5 Claims. (Cl. 29—201)

This invention relates generally to fixtures for use in the assembling of ball bearings, and more particularly is directed towards a new and improved apparatus for quickly and efficiently assembling on a semi-automatic basis ball bearing units, especially those of miniature and sub-miniature sizes.

Heretofore ball bearing assemblies, particularly those of small size, having been put together almost exclusively by manual operations which are quite slow and tedious. According to present techniques the outer race is located in a nest and the balls are picked up by adherence to the finger tips which may be oiled to improve their adherency. The operator then counts the proper number of balls required and wipes them off inside the outer race. With the balls grouped closely together on one side of the outer race, the inner race is inserted. Thereafter the ball are manually separated to approximately equally spaced position between the races and the retainer ring is inserted. Because of the small sizes of the parts, this task requires a high degree of manual dexterity as well as rapt concentration.

The manual assembly of ball bearings, in addition to being a slow and expensive process, has the further disadvantage of excessive handling of the bearing parts by the operator. The strict standards of cleanliness required in precision miniature and sub-miniature bearings are vitiated each time the bearing parts are touched by the operators during assembly.

Accordingly, it is an object of the present invention to provide an apparatus for use in assembling ball bearings on a semi-automatic basis.

Another object of this invention is to provide an apparatus for assembling ball bearings quickly and accurately without the operator's fingers touching any of the bearing parts.

Still another object of this invention is to provide a ball bearing assembling apparatus which is adapted to feed the proper number of bearing balls and position them automatically in their initial assembling positions between the races.

Yet another object of this invention is to provide an apparatus for assembling ball bearings which apparatus is provided with means to move automatically a charge of bearing balls into an evenly spaced array to receive a retainer ring.

More particularly, this invention features a ball bearing assembling apparatus employing a pick-up, transfer and positioning mechanism for extracting a predetermined number of bearing balls from a supply of bearing balls, and then positioning them in an arcuate group within the outer race of the bearing. Means are provided for holding the balls and races in position until the balls are spread between the races.

The invention also features a device for automatically distributing the bearing balls into proper spaced relation after the inner race has been inserted. As another feature of this invention, a retainer ring pick-up and transfer device is employed for mechanically installing the retainer ring precisely within the bearing.

But these and other features of the invention, along with further objects and advantages thereof, will become more fully apparent from the following detailed description of a preferred embodiment of the invention, with reference being made to the accompanying drawings, in which:

2

FIGURE 1 is a view in perspective of a bearing assembling apparatus made according to the invention, FIGURE 2 is a detail sectional view in side elevation showing the bearing ball pick-up and transfer mechanism and the bearing assembly station, FIGURE 3 is a view taken along the line 3—3 of FIGURE 1, FIGURE 4 is a cross sectional view taken along the line 4—4 of FIGURE 3, and FIGURES 5, 6 and 7 are top plan views of a ball bearing showing various stages of assembly.

Figure 5:
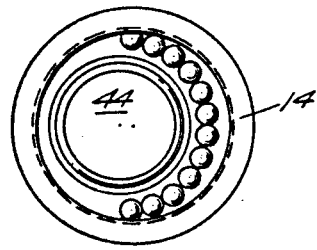
Figure 6:
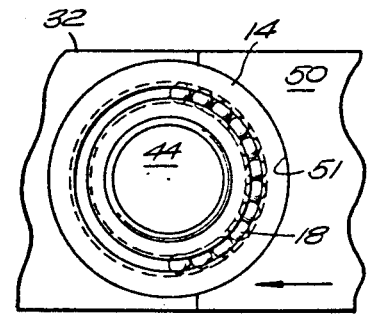
Figure 7:
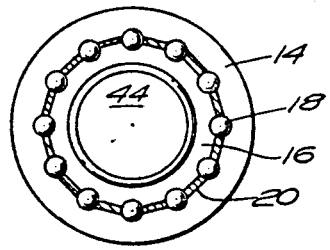

Referring now to the drawings, the reference character 10 generally, indicates an apparatus for assembling ball bearings 12 of the sort shown in FIGURES 5–7. As shown in FIGURE 7, the completed ball bearing typically comprises an annular outer race member 14, an annular inner race member 16, a plurality of bearing balls 18 disposed between the races, and a cage or retainer ring 20 which holds the balls 18 in evenly spaced relation between the races.

While the apparatus may be made to accommodate various sizes of ball bearings, it is particularly useful in the assembling of miniature and sub-miniature bearings in which typical dimensions may be on the order of ½" or less in overall diameter with bearing balls being less than ⅟₁₆" in diameter. It will be readily appreciated that the small sizes of the bearing parts make them particularly difficult to assemble manually.

Referring more particularly to FIGURE 1 of the drawings, the apparatus 10 is in the form of an upright stand having a flat base 22 on which is placed an open tray 24 holding a quantity of bearing balls 18. Rigidly mounted to the base 22 are parallel vertical rods 26 and 28 which may be connected to one another by means of a cross piece 30 and a bracket 32. A bearing ball transfer block 34 is slidably mounted to the rods 28 and 30 and is biased in a normally raised position by means of a light coil spring 36. A retainer ring transfer arm 38 pivotally engages the rod 28 above the bracket 32 and is also adapted to reciprocate along the rod 28. As illustrated in FIGURE 4 a light spring 40 urges the arm 38 into the normally raised position shown.

As best shown in FIGURE 2, the bracket 32 provides an assembling station indicated generally by the reference character 42 and includes a cylindrical boss 44 over which the various bearing parts are assembled. The boss 44 is mounted on a plate 46 secured to the bracket 32 and extends through a circular opening 48 formed through the bracket 32. It will be noted in FIGURE 3 that the opening 48 is partially blocked by the plate 46 although a substantial arcuate portion remains towards the outer end of the bracket. A slide 50, having an arcuate inner face 51, is mounted on the outer end of the bracket 32 and is adapted to be manually moved to and away from the boss 44. In practice, an outer race 14 is dropped over the boss 44 and, as suggested in FIGURE 5, is positioned eccentrically and as far towards the slide 50 as possible in order to receive a group of bearing balls 18 which will be inserted through the arcuate opening 48.

With the outer race eccentrically positioned over the boss 44, the block 34 is pushed manually downward towards the tray 24. As shown in FIGURES 1 and 2, the bifurcated outer end of the block 34 carries a rotatable hollow cylinder or manifold 52. The manifold is rotatably supported on a horizontal tubular axle 54 which at one end carries a knurled hand wheel 56 and at its opposite end is connected by a flexible tube 58 to a vacuum source. Adjustable screw stops 60 and 62 are mounted on the block 34 to engage a pin 64 extending from the axle 54 for limiting the rotational movement of the manifold 52.

Mounted securely to the manifold 52 and extending through a wall thereof is a semi-circular array of pickup tubes 66.

The tubes 66 are relatively stiff, elongated and extend in evenly spaced parallel relation to one another. The cross-sectional diameter of each tube is less than the diameter of the bearing balls 18 so that, when the block 34 and manifold assembly is pushed downwardly, the ends of the tubes 66 will contact the bearing balls in the tray 24 and the correct number of bearing balls will be picked up automatically on the ends of the tubes. The balls will be held at the tube ends under the action of the vacuum which is applied through the flexible tube 58 to the interior of the manifold 52.

With the bearing balls attached to the ends of the tubes as suggested in FIGURE 2 the manifold 52 together with its array of tubes 66 and bearing balls 18 is rotated 180° about the axle 54 by manually rotating the wheel 56. This will bring the set of bearing balls 18 into register with the arcuate opening 48 and the assembly station 42. When the bearing balls and the tubes 66 are in proper alignment with the opening 48 the block 44 is permitted to move upwardly to carry the bearing balls 18 into the opening 48 and into register with the inner groove of the outer race 14 which has been eccentrically mounted over the boss 44. At this point the inner race 16 is slipped over the boss and pressed down into position. Thereupon the slide 50 is pushed along the bracket 32 to bear against the outer race and thereby hold the bearing balls in place. With the bearing balls now held in position, the array of pick-up tubes 66 is withdrawn and returned to its downwardly extending position.

While the bearing balls are held clustered to one side of the partially assembled bearing, a ball spreader 68 is actuated. The spreader comprises a cylindrical plunger 70 attached to the lower end of a rod 72 passing slideably through the cross-piece 30 and aligned with the boss 44. The upper end of the rod is provided with a knob 74 and a guide piece 76 that follows the rod 28 to prevent rotation of the spreader about its vertical axis. A light coil spring 78 urges the spreader into the normally raised position shown in FIGURE 1.

The plunger 70 carries a series of depending, evenly spaced and parallel fingers 88 arranged in a circle about the lower peripheral margin of the plunger. The fingers are of such dimensions and so spaced that they will fit freely in the spaces that normally exist between the bearing balls in a fully assembled bearing. It will be noted that the fingers are not all of the same length but rather are graduated in length with the right hand, outermost finger, as viewed in FIGURE 1, being the longest and provided with a pointed tip. This finger enters the cluster of bearing balls first and at the middle thereof. In the case of an odd number of bearing balls, the longest finger will enter the bearing ball cluster one-half a ball diameter from the center. The remaining fingers are of shorter graduated length towards the rearmost shortest finger which is on the left-hand side as viewed in FIGURE 1 and which finger enters the bearing ball cluster last. The shortest finger is also provided with a pointed tip whereas the ends of the intermediate fingers are bevelled.

It will be understood that when the plunger is depressed the longest finger will spread the ball cluster at its center to establish the first spacing between the balls thereafter the fingers on either side of the longest finger will enter the ball cluster to make the next spaces and so on until all of the fingers are inserted. It will be appreciated that the balls will thus be shifted from the semi-circular arcuate grouping shown in FIGURE 5 into an evenly spaced array shown in FIGURE 7. It will also be appreciated that it is necessary for the bearing balls to be held in the position in which they are deposited in the pick-up tubes in order for the spreader to function properly. In this connection it may be mentioned that the pick-up tubes function best with dry bearing balls but one or both bearing races may be oiled lightly in order to help keep the bearing balls in position.

After the bearing balls have been evenly distributed between the races by means of the spreader the retainer ring 20 is applied to the bearing. The retainer ring has an annular configuration with a plurality of depending lugs which fit in the spaces between the bearing balls to hold them in the spaced arrangement provided by the spreader. The retainer ring 20 which is to be installed in the bearing is deposited with the lugs downward in a circular recess 82 formed on the outer end of a branch 84 extending diagonally from the bracket 32. As best shown in FIGURE 4, the recess 82 is formed on the upper end of a screw plug 86 threaded into a tapped opening formed in the branch 84. A set screw 88 is provided to lock the plug in position. As shown in FIGURE 3, a rib 90 is formed diametrically across the recess 82 and serves to orient the retainer ring 20 which is set in the recess by the operator.

The retainer ring 20 is transferred from the branch 84 to the assembly station 42 by means of the transfer arm 38 which is normally located directly above the branch 84 and parallel to it. The spring 40 will be seen in FIGURE 4 to be connected at its lower end to the bracket 32 and at its upper end to the hub of a knurled wheel 92 which is rigidly connected to the arm 38. The spring 40 is under a light winding pressure to urge the transfer arm to the position shown in FIGURE 1. A stop pin 94 extends from the wheel 92 to engage the rod 26 and thereby limit the angular movement of the arm 38. Movement in the opposite direction is limited by the rearward end of the arm 38 striking the opposite side of the rod 26.

Attached to the outer end of the transfer arm 38 is a retainer ring pick-up nozzle 96 which has an upper end connected to a flexible tube 98 leading to a vacuum source. The lower end of the nozzle 96 is recessed and fitted with a cap 100 to define a chamber 102. The cap is formed with a recess 104 and an annular array of spaced passages 106 communicating with the chamber 102. The nozzle 96 is normally in register with the retainer ring recess 82. A retainer ring 20 located in the recess is picked up by manually depressing the transfer arm 38 downwardly until the nozzle 96 covers the ring 20 and the vacuum is able to hold the ring within the recess 104. Thereupon the transfer arm is permitted to move upwardly and it is then rotated about the rod 28 to a position directly over the assembly station 42. The transfer arm is again manually depressed downwardly until the retainer ring 20 is inserted fully between the bearing races. The retainer ring will then snap into position and the transfer arm raised and returned to its normal position.

The assembly of the bearing is then completed and it may be manually removed from the assembly station 42. To facilitate its removal the side edges of the bracket 32 are bevelled at 108.

In order to permit minor adjustments of the various parts of the apparatus, a number of screw adjustments are provided. For example, in FIGURE 3 a pair of screws 110 engage opposite sides of the rod 26 in order to position angularly the block 34 about the rod 28. The wheel 92 with its pin 94 may also be angularly adjusted by means of a set screw 112 which engages the rod 128.

It will be appreciated that ball bearings may be assembled much more rapidly and precisely with the apparatus than may be accomplished by the conventional manual techniques. Also the bearings may be assembled in a much cleaner condition. The various components may be put together without the operator's fingers touching any parts since the bearing balls are picked up automatically and the races and retainer rings may be applied with tweezers or the like. Quite obviously the apparatus may be fabricated for use in assembling bearings of various sizes although its utility has particular significance in connection with the assembling of small size bearings.

While the invention has been described with particular reference to the illustrated embodiment, it will be understood that numerous modifications thereto will appear to those skilled in the art. It will also be understood that the above description and accompanying drawings should be taken as illustrative of the invention and not in a limiting sense.

Having thus described my invention what I claim and desire to obtain by Letters Patent of the United States is:

1. Apparatus for use in assembling ball bearings having inner and outer races and a plurality of bearing balls distributed between said races, comprising means for mounting one of said races in fixed position, a plurality of tubes the outer ends of which are arrayed in an arc generally of the same radius as the inner groove of the outer race, said tubes and said race mounting means being mounted for movement to and away from one another, said tubes having their inner ends connected to a source of vacuum whereby the outer ends thereof are adapted to pick up a predetermined number of bearing balls in an arcuate array when in contact with a supply of bearing balls and to transfer the same into the groove of one of said races prior to the assembly of the other of said races, said tubes and said supply of bearing balls being mounted for relative movement to and away from each other.

2. Apparatus according to claim 1 including means for spreading said balls into evenly spaced relation.

3. Apparatus according to claim 2 including means for applying a ball retainer ring between said races.

4. Apparatus for use in assembling ball bearings having inner and outer races and a plurality of bearing balls distributed between said races, comprising a bracket, said bracket being formed with an opening extending therethrough, a boss mounted within said opening and defining with said opening an arcuate passage, a slide mounted on said bracket adjacent said arcuate passage and adapted to be moved to and away from said boss, a plurality of movable tubes the outer ends of which are arrayed in an arc of the same radius as said passage, said tubes having their inner ends connected to a source of vacuum whereby the outer ends thereof are adapted to pick up a predetermined number of bearing balls in an arcuate array when moved into a supply of bearing balls and to transfer the same through said arcuate passage and into the groove of an outer race set over said boss, said boss being adapted to receive an inner race when said bearing balls have been located within said outer race, said slide being adapted to hold said races and said balls in position against said boss, and means for spreading said bearing balls into evenly spaced relation between said races.

5. Apparatus for use in assembling ball bearings having inner and outer races, a plurality of bearing balls distributed between said races and a retainer ring maintaining said balls in evenly spaced relation, comprising a horizontally disposed bracket, said bracket being formed with an opening extending vertically therethrough, a cylindrical boss mounted within said opening and defining with said opening an arcuate passage, a slide mounted on said bracket adjacent said arcuate passage and adapted to be moved to and away from said boss, a plurality of tubes the outer ends of which are arrayed in an arc of the same radius as said passage, said tubes being mounted for vertical reciprocation and rotation about a horizontal axis below said passage, said tubes having their inner ends connected to a source of vacuum whereby the outer ends thereof are adapted to pick up a predetermined number of bearing balls in an arcuate array when lowered into a supply of bearing balls and to transfer the same through said arcuate passage and into the groove of an outer race set eccentrically over said boss, said boss being adapted to receive an inner race when said bearing balls have been located within said outer race, said slide being adapted to hold said races and said balls in position against said boss, and means for automatically spreading said bearing balls into evenly spaced relation between said races to receive a retainer ring placed therebetween.

References Cited in the file of this patent
UNITED STATES PATENTS

| | | |
|---|---|---|
| 2,931,095 | Esken | Apr. 5, 1960 |
| 3,025,590 | Litz | Mar. 20, 1962 |